(12) United States Patent
Orbach et al.

(10) Patent No.: US 9,125,144 B1
(45) Date of Patent: Sep. 1, 2015

(54) PROXIMITY-BASED FEATURE ACTIVATION BASED ON PROGRAMMABLE PROFILE

(75) Inventors: Julian Orbach, Macquarie Park (AU); Karen Barrett, Chatswood (AU); Muneyb Minhazuddin, Quakers Hill (AU)

(73) Assignee: Avaya Inc., Basking Ridge, NJ (US)

( * ) Notice: Subject to any disclaimer, the term of this patent is extended or adjusted under 35 U.S.C. 154(b) by 2075 days.

(21) Appl. No.: 11/773,276

(22) Filed: Jul. 3, 2007

Related U.S. Application Data

(63) Continuation-in-part of application No. 11/551,346, filed on Oct. 20, 2006, now Pat. No. 8,050,665.

(51) Int. Cl.
*H04M 3/42* (2006.01)
*H04W 40/18* (2009.01)

(52) U.S. Cl.
CPC ...................................... *H04W 40/18* (2013.01)

(58) Field of Classification Search
CPC ....................... H04M 1/72569; H04M 2250/12
USPC .......................... 455/456.1, 414.2, 415, 412.2
See application file for complete search history.

(56) References Cited

U.S. PATENT DOCUMENTS

| | | | |
|---|---|---|---|
| 4,993,068 A | 2/1991 | Piosenka et al. | |
| 5,428,663 A | 6/1995 | Grimes et al. | |
| 5,956,626 A * | 9/1999 | Kaschke et al. | ............ 455/115.1 |
| 6,067,621 A | 5/2000 | Yu et al. | |
| 6,400,996 B1 | 6/2002 | Hoffberg et al. | |
| 6,438,393 B1 | 8/2002 | Suuronen | |
| 6,650,894 B1 * | 11/2003 | Berstis et al. | ................. 455/420 |
| 6,883,095 B2 | 4/2005 | Sandhu et al. | |
| 6,915,123 B1 | 7/2005 | Daudelin et al. | |
| 6,928,166 B2 | 8/2005 | Yoshizawa | |
| 6,928,558 B1 | 8/2005 | Allahwerdi et al. | |
| 6,934,848 B1 | 8/2005 | King et al. | |
| 6,968,179 B1 | 11/2005 | De Vries | |
| 6,976,164 B1 | 12/2005 | King et al. | |
| 6,987,948 B2 * | 1/2006 | Engstrom et al. | ............ 455/41.1 |
| 6,999,562 B2 | 2/2006 | Winick | |
| 7,016,666 B2 | 3/2006 | Lauper et al. | |
| 7,212,827 B1 * | 5/2007 | Veschl | ....................... 455/456.1 |
| 7,346,336 B2 | 3/2008 | Kampel et al. | |
| 7,369,845 B2 | 5/2008 | Keohane et al. | |
| 7,444,383 B2 | 10/2008 | Horvitz | |
| 7,613,659 B1 * | 11/2009 | Hoffman et al. | ................ 705/44 |
| 7,689,199 B2 | 3/2010 | Gough | |

(Continued)

OTHER PUBLICATIONS

"Accessing a Smart Card" at http://msdn.microsoft.com/library/en-us/security/security/accessing_a_smart_card.asp (Aug. 2002), p. 1.

(Continued)

*Primary Examiner* — Barry Taylor
(74) *Attorney, Agent, or Firm* — Sheridan Ross P.C.

(57) ABSTRACT

Disclosed herein is a system and method for selectively enabling or disabling rings or other alerts associated with a mobile communication device. A mobile communication device in accordance with embodiments of the present invention includes one or more programmable profiles that establish the behavior of the mobile communication device for a number of different proximity levels between the user and the device. Accordingly, by applying a determined proximity level and an applicable programmable profile, an alert type maybe selected.

20 Claims, 6 Drawing Sheets

(56) References Cited

U.S. PATENT DOCUMENTS

| | | | | |
|---|---|---|---|---|
| 7,956,766 | B2* | 6/2011 | Yasuda et al. | 340/4.37 |
| 8,050,665 | B1* | 11/2011 | Orbach | 455/418 |
| 8,306,508 | B1* | 11/2012 | Lundy et al. | 455/412.2 |
| 8,803,697 | B2* | 8/2014 | Rautiainen | 340/670 |
| 2001/0049275 | A1* | 12/2001 | Pierry et al. | 455/414 |
| 2002/0010008 | A1* | 1/2002 | Bork et al. | 455/567 |
| 2002/0038422 | A1 | 3/2002 | Suwamoto et al. | |
| 2002/0112186 | A1 | 8/2002 | Ford et al. | |
| 2002/0137552 | A1* | 9/2002 | Cannon et al. | 455/567 |
| 2002/0154036 | A1 | 10/2002 | Flick | |
| 2002/0194473 | A1 | 12/2002 | Pope et al. | |
| 2003/0003965 | A1 | 1/2003 | Gough et al. | |
| 2003/0144959 | A1 | 7/2003 | Makita | |
| 2004/0030753 | A1* | 2/2004 | Horvitz | 709/206 |
| 2004/0076324 | A1 | 4/2004 | Burl et al. | |
| 2004/0103324 | A1 | 5/2004 | Band | |
| 2004/0127198 | A1 | 7/2004 | Roskind et al. | |
| 2004/0162998 | A1 | 8/2004 | Tuomi et al. | |
| 2004/0180646 | A1 | 9/2004 | Donley | |
| 2004/0209594 | A1 | 10/2004 | Naboulsi | |
| 2004/0252197 | A1* | 12/2004 | Fraley et al. | 348/207.1 |
| 2005/0101314 | A1 | 5/2005 | Levi | |
| 2005/0191969 | A1* | 9/2005 | Mousseau | 455/90.2 |
| 2005/0227676 | A1* | 10/2005 | De Vries | 455/414.1 |
| 2005/0259641 | A1 | 11/2005 | Beninato et al. | |
| 2005/0266891 | A1 | 12/2005 | Mullen | |
| 2006/0105817 | A1 | 5/2006 | Naick et al. | |
| 2006/0116175 | A1 | 6/2006 | Chu | |
| 2006/0167944 | A1* | 7/2006 | Baker | 707/104.1 |
| 2006/0181411 | A1 | 8/2006 | Fast et al. | |
| 2006/0270421 | A1 | 11/2006 | Phillips et al. | |
| 2006/0293037 | A1 | 12/2006 | Signore et al. | |
| 2007/0032832 | A1 | 2/2007 | Feher et al. | |
| 2007/0173233 | A1* | 7/2007 | Vander Veen et al. | 455/413 |
| 2007/0247366 | A1* | 10/2007 | Smith et al. | 342/464 |
| 2008/0032703 | A1* | 2/2008 | Krumm et al. | 455/456.1 |
| 2012/0286965 | A1* | 11/2012 | Rautiainen | 340/670 |

OTHER PUBLICATIONS

"Base Service Providers" at http://msdn.microsoft.com/library/en-us/security/security/base_service_providers.asp (Aug. 2002), p. 1.

"Building an ISO7816-4 APDU Command" at http://msdn.microsoft.com/library/en-us/security/security/building_an_iso7816_4_apdu_command.asp (Aug. 2002), pp. 1-2.

"Introducing Smart Cards to the System" at http://msdn.microsoft.com/library/en-us/security/security/introducing_smart_cards_to_the_system.asp (Aug. 2002), p. 1.

"Primary Service Provider" at http://msdn.microsoft.com/library/en-us/security/security/primary_service_provider.asp (Aug. 2002), p. 1.

"Smart Card Authentication" at http://msdn.microsoft.com/library/en-us/security/security/smart_card_authentication.asp (Aug. 2002), pp. 1-2.

"Smart Card Interfaces" at http://msdn.microsoft.com/library/en-us/security/security/smart_card_interfaces.asp (Aug. 2002), p. 1.

"Smart Card Resource Manager" at http://msdn.microsoft.com/library/en-us/security/security/smart_card_resource_manager.asp (Aug. 2002), p. 1.

"Smart Card Service Providers" at http://msdn.microsoft.com/library/en-us/security/security/smart_card_service_providers.asp (Aug. 2002), p. 1.

"Smart Card User Interface" at http://msdn.microsoft.com/library/en-us/security/security/smart_card_user_interface.asp (Aug. 2002), p. 1.

"The Cricket Indoor Location System: An NMS Project @ MIT LCS" at http://nms.lcs.mit.edu/projects/cricket (Jul. 31, 2002), pp. 1-5.

"Vendor Wrapper Service Provider" at http://msdn.microsoft.com/library/en-us/security/security/vendor_wrapper_service_provider.asp (Aug. 2002), pp. 1-2.

ADTech Engineering, IP Phone SI-160 User Manual (SCCP releases) Version 1.2 (2002), pp. 1-20.

Datakey, "Securing a Virtual Private Network with Smart Card Technology" available at www.datakey.com, pp. 1-8, Aug. 1, 2002.

Roger Clarke, "Centrelink Smart Card Technical Issues Starter Kit Chapter 7" (Apr. 8, 1998) at http://www.anu.edu.au/people/Roger.Clarke/DV/SCTISK.html, pp. 1-3.

Notice of Allowance for U.S. Appl. No. 11/551,346, mailed Jun. 23, 2011.

Official Action for U.S. Appl. No. 11/551,346, mailed Nov. 29, 2010.

Official Action for U.S. Appl. No. 11/551,346, mailed Apr. 25, 2011 16 pages.

* cited by examiner

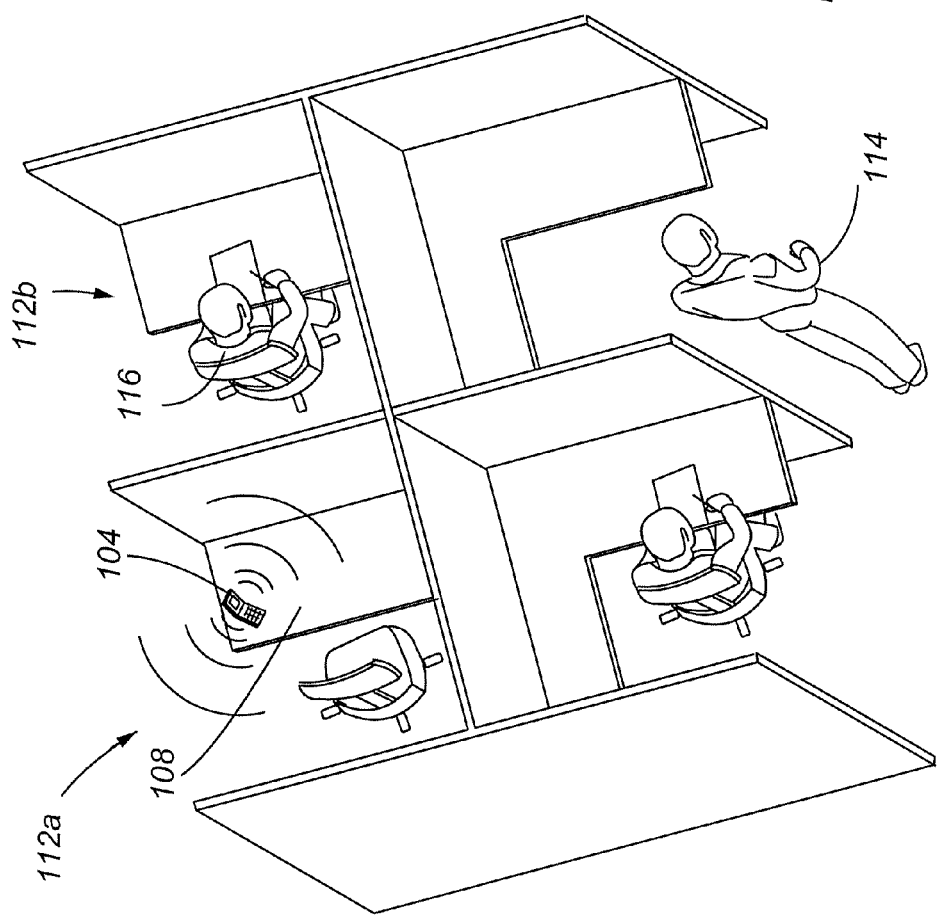

|  | Office | Home | Travel |
|---|---|---|---|
| Very Close | Vibrate | Soft | Vibrate |
| Close | Soft | Medium + Vibrate | Medium |
| Near By | Silent | Loud | Loud |
| Distant | Silent | Loud | Silent |
| Important Call Expected: No | | | |

*Fig. 2A*

|  | 9AM-5PM | 5PM-9AM |
|---|---|---|
| Very Close | Vibrate | Soft |
| Close | Soft | Soft |
| Near By | Silent | Loud |
| Distant | Silent | Loud |
| Important Call Expected: Yes | | |

*Fig. 2B*

PROXIMITY-BASED FEATURE ACTIVATION BASED ON PROGRAMMABLE PROFILE

CROSS-REFERENCE TO RELATED APPLICATIONS

The present application is a continuation-in-part application of U.S. patent application Ser. No. 11/551,346 filed on Oct. 20, 2006. The contents of the aforementioned patent application are incorporated herein by reference in their entirety.

FIELD

Human perceptible alerts for mobile communication devices.

BACKGROUND

Mobile communication devices, such as cellular phones, are commonly used by people today. When carried with a person throughout the day, these devices may ring at inappropriate times. For example, a phone may ring while a person is in a theater or a pager may beep while a person is in a meeting. Additionally, if these devices are left unattended, the rings and/or alert that they provide may be disruptive to others who are nearby.

As is commonly known, mobile communication devices include a variety of mechanisms for alerting a user of an event associated with the communication device. For example, a cellular phone rings when an incoming call is received. Additionally, alert reminders may be provided to inform the user that a message has been received. These messages may be in a variety of different forms such as text, voice or instant message. Alert reminders may also be given to inform the user of a condition associated with the device such as a low battery. Any one of these rings or alerts, when given while device is in a public place, may potentially be disturbing or irritating for the user or others nearby.

A solution to this problem is for the user to manually mute or otherwise disable the rings or alerts associated with the mobile communication device during those times when audile rings and/or alerts would be irritating or disruptive. This solution suffers from several drawbacks. First, the rings and/or alerts must be continually disabled and enabled depending on the user's location or the time of day. Second, a user may forget to disable the rings or alerts and inadvertently bring his or her mobile communication device into an environment where its operation may be disruptive. Similarly, the user may forget to disable rings or alerts when the phone is left behind in a public place such as an open plan office. A user might also forget to re-enable rings or alerts and miss a call or message.

Accordingly, it would be desirable to have a system that changes rings and or alert modes of a mobile communication device without intervention from the user. Furthermore, it would be desirable to have mobile communication device system that minimizes the bothersome effect that its audible alerts may have on people other than the user of the device.

SUMMARY

The present invention is directed to a programmable profile system for a mobile communication device. Generally, the programmable profile system of the present invention operates to automatically enable or disable rings or alert mechanisms associated with a mobile communication device based on the user's proximity to the communication device. As a result, audile rings and/or alert reminders are less likely to bother other people unnecessarily. More particularly, a mobile communication device in accordance with embodiments of the present invention has one or more programmable profiles that establish the alert behavior of the mobile communication device. A particular profile may be active depending on the user's preference or a particular context in which the mobile communication device is being used. A particular profile may include settings specifying rings and/or alerts that are generated, depending on the user's proximity to the communication device. Additionally, a particular profile may include a setting that causes the mobile communication device to issue a warning to the user when it is determined that he or she is moving away from his or her mobile communication device.

The present invention may employ one or more different methods for detecting the user's proximity to the mobile communication device. The present invention may compare presence information associated with the user and location information associated with the mobile device to determine if the user and the device are in close proximity. Alternatively or in combination, the present invention may detect the proximity of the user to the mobile communication device by detecting motion of the device. In particular, if the device is in motion, embodiments of present invention assume that the device is in the possession of the user and thus in close proximity to him or her. Additionally, the mobile communication device may be provided with a RFID detector used to read an RFID tag associated with the user of the mobile communication device in order to determine if the user and the device are in close proximity.

The present invention may employ any one of a number of possible motion detection methods. For example, motion of the mobile communication device may be detected by changes in scenery as viewed from a camera associated with the device, changes in the velocity of the device as measured by inertial detectors, and/or changes in the strength of mobile communication signals. Alternatively, global positioning system technology may be used to detect motion of the mobile communication device. These methods may be used alone or in combination to detect motion of the mobile communication device.

The present invention may operate to enable, disable or adjust the settings for various alert mechanisms associated with a mobile communication device. For example, the present invention may enable or adjust the manner in which a mobile communication device rings in response to an incoming call. Additionally, a mobile communication device may provide an audible alert to remind the user of the mobile communication device that he or she has a message that has not been accessed, or regarding a condition of the mobile communication device. The manner in which this type of alert is given may also be adjusted by a programmable profile system in accordance with the present invention.

BRIEF DESCRIPTION OF THE DRAWING

FIG. 1 is a schematic depiction of an environment in which a communication device associated with a programmable profile system in accordance with embodiments of the present invention operates;

FIG. 2A is a schematic depiction of an exemplary set of programmable profiles in accordance with embodiment of the present invention;

FIG. 2B is a schematic depiction of another exemplary set of programmable profiles in accordance with embodiments of the present invention;

DETAILED DESCRIPTION

Figure 3A:
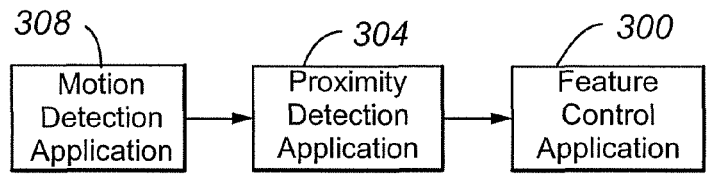
FIG. 3A is a block diagram of components of a programmable profile system in accordance with embodiments of the present invention.

The present invention is directed to a programmable profile system for a mobile communication device that is responsive to information related to a user's proximity to his or her mobile communication device. A programmable profile system in accordance with embodiments of the present invention operates to activate or deactivate features of a mobile communication in response to a user's proximity to the device. Features are activated or deactivated based on a profile programmed by the user and stored as one or more programmable profiles.

Turning now to FIG. 1, an exemplary environment in which components and features of a programmable profile system 100 may have application are illustrated. In particular, FIG. 1 shows a mobile communication device 104 that has been left unattended at a desk 108 in a workplace environment. The mobile communication device 104 may, for example, be a cellular phone, personal digital assistant (PDA), wristwatch, an environmental detector or other device capable of mobile communication. The desk 108 is located in a cubicle 112a. An adjacent cubicle 112b in the workplace environment is also shown. The user 114 of the mobile communication device 104 is shown away from his or her desk 108. A co-worker 116 is, however, at his or her desk in the adjacent cubicle 112b.

FIG. 1 illustrates a situation in which a call is placed to the mobile communication device 104 at a time when the user has left the device 104 unattended. If the mobile communication. device is enabled to provide an audible ring, then it is likely that people nearby, such as co-worker 116, may become irritated by calls that go unanswered. Additional sources of irritation for the co-worker 116 may include audible alert reminders given by the mobile communication device 104 to indicate various conditions associated with the device 104. For example, if the calling party chooses to leave a voice message, then the mobile communication device 104 may provide one or more audible alerts to remind the user that a message has been received and is waiting to be reviewed. Audible alerts may be provided for unreviewed messages in any form supported by the mobile communication device 104, such as voice mail, text messages, or picture messages. Additionally, audible alerts may be associated with time or calendar alarms. For Internet enabled communication devices, audible alerts may be associated with such communications as arriving emails, news alerts, weather alerts, and stock watch alarms. As can be appreciated by one of skill in the art, a mobile communication device 104 may also provide an alert after detecting a missed call or another condition requiring the user's attention, such as a low battery. Prior art alert reminders typically sound continually at regular intervals until either the alert is disabled, the message is heard, or the condition is addressed or acknowledged.

The present invention can avoid audible rings and/or alert reminders such as these from becoming a source of irritation to co-workers or others who may be in the presence of an unattended mobile device. In particular, one or more profiles (hereafter referred to as programmable profiles) are set up by the user establishing the required behavior of the mobile communication device 104 for different proximities of the user to the mobile communication device 104. For example, the user may setup an "Office Profile" that disables audible rings and audible alert reminders when it is determined that the user and the device 104 are not in close proximity. Conversely, when the user and the device 104 are in close proximity, the "office profile" may enable audible rings and audible alerts. Alternatively or in combination, notification may be provided in the form of a pop-up on a computer screen.

Typically, mobile communications devices such as cellular phones offer a variety of different audible ring or alert types. For example, a user may set his or her ring type to "Loud", "Soft", "Vibrate", "Silent", or "Vibrate and Ring." Settings for these different ring types may be incorporated into a particular profile. For example, the "Office Profile" may specify that when the user and the mobile communication device 104 are in close proximity the ring type is set to "Soft", and when the user and the device 104 are not in close proximity the ring type is set to "Silent."

In accordance with embodiments of the present invention, different levels of proximity between the user and the mobile communication device 104 may be defined and used by a programmable profile. For a particular programmable profile, an exemplary set of proximity levels between the user and the device 104 could be defined as "Very Close", "Close", "Near By", or "Distant." A "Very Close" proximity would correspond to the user having the device 104 on his or her person. A "Close" proximity would correspond to a distance commensurate with the device 104 being placed on a desk where the user is sitting. A "Near By" proximity would correspond to a distance commensurate with the device being placed on a desk and the user being located in a nearby cubicle or room. A "Distant" proximity would correspond to a distance commensurate with the user and the device being in separate buildings. Continuing with the "Office Profile" example, the user may specify that the phone be set to "Vibrate" when it is determined that the user's proximity to the mobile communication device 104 is "Very Close", "Soft" when the proximity is "Close", and silent for all other proximities.

In addition to an "Office Profile", the user may set up other profiles that establish behavior of the mobile communication device in different contexts such as during particular hours of the day and/or particular locations. For example, a "Home Profile" might be setup to establish behavior of the mobile communication device in the evening. In particular, a user may specify that that the mobile communication device be set to "Vibrate" when it is determined that the user's proximity to the mobile communication device 104 is "Very Close", "Soft" when the proximity is "Close", "Loud" when the proximity is "Near By", and "Silent" when the proximity is "Distant." The mobile communication device may automatically switch profiles based on a tune of day or the detected location of the device. Additionally, the mobile communication device may switch profiles or other change modes of operation depending on input from an electronic calendar.

In accordance with embodiments of the present invention, an "Important Call Expected" setting may be incorporated into a particular profile. This profile setting would instruct the mobile communication device to issue a warning tone if it detects that the user is moving away from his or her mobile communication device 104.

In accordance with embodiments of the present invention, the programmable profile system 100 may operate to activate or deactivate only a portion of an audible ring or alert reminder. For example, for those alert reminders that typically sound continually at regular intervals, the present invention may provide a first reminder and thereafter suppress further reminders. In particular, mobile communication devices 104 may provide a first alert reminder that is sounded after the message is initially received by the mobile communication device 104. This first reminder serves to alert the user once if he or she is in the vicinity of the device 104. Thereafter, additional alerts will only sound if it can be determined that the mobile communication device 104 is in close proximity to the user. Furthermore, a first alert may be given for each message that is received. Accordingly, a profile may be set to allow the first reminder to sound and, thereafter to suppress continual alerts. Alternatively, continual alerts may be provided by an alternative ring type such as "Vibrate." Later, when it is determined that the user and the mobile communication device 104 are in close proximity, additional alerts may be sounded for all outstanding messages. This may include sounding separate alerts corresponding to separate message types.

In addition to providing programmable profiles related to incoming calls and messages, embodiments of the present invention may provide programmable profiles for messages related to the operation of the mobile communication device 104. For example, it is common for a mobile communication device 104 to provide an audible alert indicating that an on-board battery is low. Typically, the alert is given at regular intervals until the user attends to the message by plugging the communication device into a charging device. A low battery warning delivered in accordance with embodiments of the present invention can operate differently. In particular, the warning can be given based on a programmable profile that specifies the behavior of the device at a given proximity FIG. 2A shows a programmable profile 200 comprising a number of exemplary programmable profile settings 202-208 and associated alerts 210 for different proximities of the user 114 to the device 104. In particular, an Office Profile setting 202, a Home Profile setting 204, and a Travel Profile setting 208 are defined. More particularly, each of the three settings included in the exemplary programmable profile 200 includes an alert setting 210 for each of the following proximity levels: "Very Close" 212, "Close" 216, "Near By" 220, and "Distant" 224.

In connection with the exemplary programmable profile 200, consider the case in which a user 114 leaves his or her mobile communication device 104 behind when he or she leaves the office for lunch. The mobile communication device 104 will behave according to the behavior defined by the settings in FIG. 2A. In particular, the "Office Profile" setting 202 will be enabled, either by being manually enabled by the user 114, or by being automatically enabled after a determination that the mobile communication device 104 is located in the office. If the mobile communication device 104 receives a call while the user 114 is at lunch, the proximity between the user 114 and the device 104 will be determined. Then, the "Office Profile" setting 202 of the programmable profile 200 will be accessed to determine the mechanism by which the device 104 will provide an alert. In particular, the Office Profile setting 202 requires that the mobile communication device 104 provide a "Silent" alert 210 when the user 114 and the device 104 have a Distant 224 proximity.

By way of further example, say that the user 114 returns from lunch and places the mobile communication device 104 in a jacket pocket for the remainder of the workday. Any alerts 210 will then be provided by a "Vibrate" alert mechanism as specified by the Office Profile setting 202 for Very Close 512 proximities. Later, when the user 114 leaves work to go home, the behavior of the mobile communication device 104 may be governed by the Home Profile setting 204. Similarly, when the user 114 is traveling the behavior of the mobile communication device may be governed by the Travel Profile setting 208. Additionally, as shown in FIG. 2A, the Important Call Expected 228 setting is not enabled. Accordingly, no alerts 210 will be provided when it is determined that the user 114 is moving away from the mobile communication device 104.

In accordance with an alternative embodiment of the invention, FIG. 2B shows exemplary programmable profile 200 comprising a set of programmable profile settings 232-236 that are established for different hours of the day. In particular, a 9 AM-5 PM Profile setting 232 is defined for daytime hours, and a 5 PM-9 AM Profile setting 236 is defined for evening and nighttime hours. More particularly, each of the two profile settings includes an alert setting 238 for each of the following proximity levels: "Very Close" 240, "Close" 244, "Near By" 248, and "Distant" 252. For a mobile communication device 104 governed by the programmable profile setting 232-236 established in FIG. 2B, when a call is placed to the device 104 during daytime hours (9 AM-5 PM Profile 232) and the user 114 and the device 104 are in a "Near By" 248 proximity, a "Silent" alert will be provided. However, when a call is placed to the same device 104 during nighttime hours (5 PM-9 AM Profile setting 604) and the user 114 and the device 104 are in a "Near By" 248 proximity, a "Loud" alert 210 will be provided. Additionally, as shown in FIG. 2B, the Important Call Expected 256 setting is enabled. Accordingly, an alert 210 will be provided when it is determined that the user 114 is moving away from the mobile communication device 104.

FIGS. 3A-D are block diagrams of functional components of a programmable profile system 100 used in connection with various embodiments of the present invention, and include a number of different methods for determining the proximity between the mobile communication device 104 and the user 114. Generally, the programmable profile system 100 includes a feature control application 300 that is responsive to a proximity detection application 304. The proximity detection application 304 operates to determine the proximity of the mobile communication device 104 to its user 114. FIGS. 3A-D each depict different way in which the programmable profile system 100 may be implemented. While a particular embodiment of the present invention may be implemented as shown in one of FIGS. 3A-D, it should be understood that other embodiments may include a combination of two or more of the techniques shown in FIG. 3A-D.

Referring now to FIG. 3A, the proximity detection application 304 may determine the user's 114 proximity to the mobile communication device by detecting motion of the mobile communication device 104 or by receiving input from a motion detection application 308 that detects motion of the mobile communication device 104. If it is determined that the device 104 is in motion, it can be assumed that the device 104 is in the possession of the user 114 and thus in close proximity to the user 114. The operation of a motion detection application 308 is described in detail below in connection with particular components of the mobile communication device 114. Such a method for determining proximity may be useful in determining the "very close" proximity level described above.

Figure 3B:
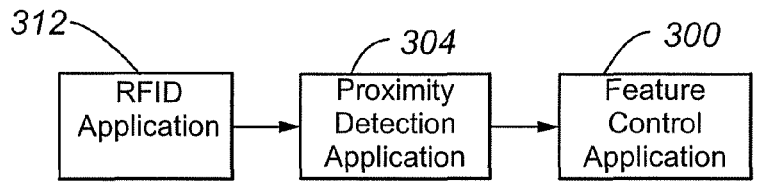
FIG. 3B is a block diagram of components of a programmable profile system in accordance with another embodiment of the present invention.

Referring now to FIG. 3B, the proximity detection application 304 may determine the user's 114 proximity to the mobile communication device by receiving input from a Radio Frequency Identification (RFID) application 312. In particular, the RFID application may use known devices and/or methods to identify a user 114 by reading one more tags that may be associated with him or her. As RFID technology has a limited range, if a person's tag can be read it can be assumed that they are in close proximity to their mobile communication device.

The use of an RFID system to determine the user's proximity to the mobile communication device may be particularly useful in connection with the "Important Call Expected" profile setting described above. In particular, the RFID system is able to sense when a user 114 starts to move away from his or her mobile communication device 104. The mobile communication device 104 is then able to provide an alert or other notification to the user 114 warning him or her that an important call is expected and not to move away from the mobile communication device 104. In accordance with embodiments of the present invention the mobile communication device may provide the alert using an alert type as specified by the user 114 in a particular programmable profile. Alternatively, the other methods may be used to determine that the user 114 is moving away from his or her mobile communication device 104, such as by comparing the location information for the wireless device 104 and presence information for the user 114.

Figure 3C:
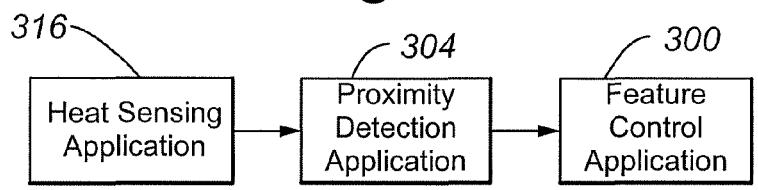
FIG. 3C is a block diagram of components of a programmable profile system in accordance with yet another embodiments of the present invention.

Referring now to FIG. 3C, the proximity detection application 304 may determine the user's 114 proximity to the mobile communication device by receiving input from a heat sensing application 316. The heat sensing application 316 may be associated with a heat-sensing device on the communication device 104, which is operable to detect body heat of the user 114. As will be appreciated, if body heat is detected it can be assumed that the device 104 and the user 114 are in close proximity.

Figure 3D:
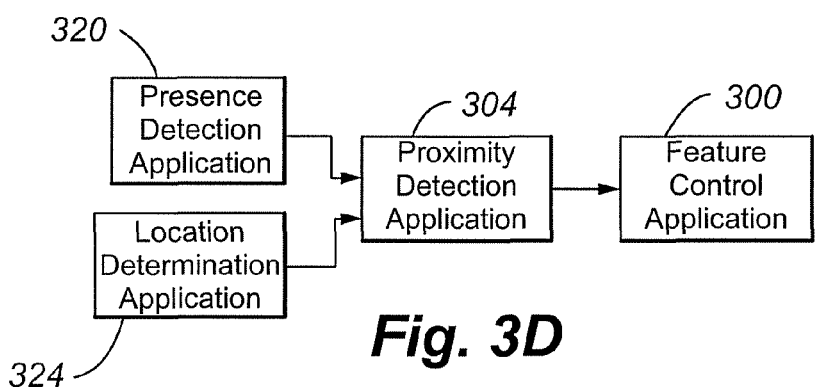
FIG. 3D is a block diagram of components of a programmable profile system in accordance with still another embodiments of the present invention.

Referring now to FIG. 3D, the proximity detection application 304 may use presence information for the user 114 who is provided a presence detection application 320. Presence information as used herein generally includes information pertaining to the location and/or availability of a person. As can be appreciated by one of skill in the art, presence information can be derived from location information concerning one or more devices that are believed to be in the vicinity (or possibly in the vicinity) of the user 114, other than the mobile communication device. By way of example and not limitation, such information can include electronic events that provide information regarding the approximate physical location of a person or a device. Examples of such events include placing a telephone call, logging into a network computer, swiping a credit card, or swiping an electronic identification badge. Information concerning the availability of a person, including the preferred method of contacting the person, can be inferred from electronic events associated with the person or can be explicitly stated. Additional resources for deriving presence information may include an electronic calendar including scheduling information for the person.

Figure 4:
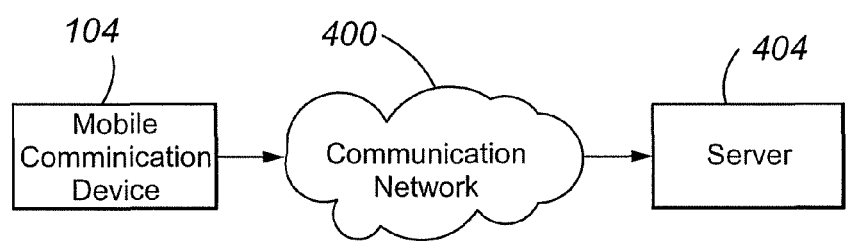
FIG. 4 is a schematic depiction of components of the embodiment of the present invention shown in FIG. 3D.

In order to better describe the use of presence information to determine the proximity between the user 114 and the communication device 104, reference is made to FIG. 4, which shows the communication device 104 in connection with a communications network 400. The communication network 400 may include wireless and and/or wired connections, and may implemented with packet switched and/or circuit switched technology. The communication network 400 may include a portion of the Public Switched Telephony Network (PSTN). Additionally, the communication network may include a portion of a distributed data network such as the Internet or the World Wide Web. As can be appreciated by one of skill in the art, the network may include one or more servers such as presence server 404. At least a portion of the presence detection application 320 may be running on the communication device 104 and/or the server 404.

Still referring to the embodiment of the present invention depicted in FIG. 3D, the proximity determining application 304 may acquire information regarding the location of the mobile communication device 104 from a location determining application 324. As can be appreciated by one skilled in the art, location information for the mobile communication device 104 and the user 114 of the mobile communication device 104 can differ. Differing location information can be used to determine the user's 114 proximity to the communication device 104. By way of example, consider the situation in which a user 114 leaves his or her place of employment for lunch and inadvertently leaves his or her mobile communication device 104 at a desk. The mobile communication device 104 will remain in the mobile communication cell 212 whose base station 208 has a coverage area that includes the user's 114 place of employment. Assuming the user's 114 location during lunch is in a different mobile communication cell 212, the user 114 will generate presence information indicative of a different location as a result of either paying for lunch with a credit card or logging on to a mobile network through a laptop computer. This differing location information indicates that the mobile communication device 104 and the user 114 of the mobile communication device 104 are separated by a significant distance.

In accordance with embodiments of the present invention, the mobile network server 404 may run the location determining application 324 and may obtain the location information by determining an approximate location for the mobile communication device 104 based on the device's operation within the communication network 404. Alternatively or in addition, at least a portion of the location determining application 324 may be run on the mobile device 104. In accordance with embodiments of the present invention, the location determining application 324 may use data obtained from a global positioning system or terrestrial triangulation techniques to provide more precise location information for the mobile communication device 104. Additionally, if the mobile communication device 104 employs the use of Bluetooth™ technology or an 802.11 mobile interface, known techniques may be used to determine position. As a further example, a docking cradle that is connected to a computer with a known location could be used to determine position.

In accordance with yet another embodiment of the present invention, an application comprising both a presence detection algorithm and proximity detection algorithm may be executed on the mobile device 104 and can include the use of a heuristic algorithm to determine presence information. Such an algorithm can employ the use of an electronic scheduling calendar or other predictive means related to the location of the user 114 to determine whether the mobile communication device 104 is at an expected location.

Figure 5:
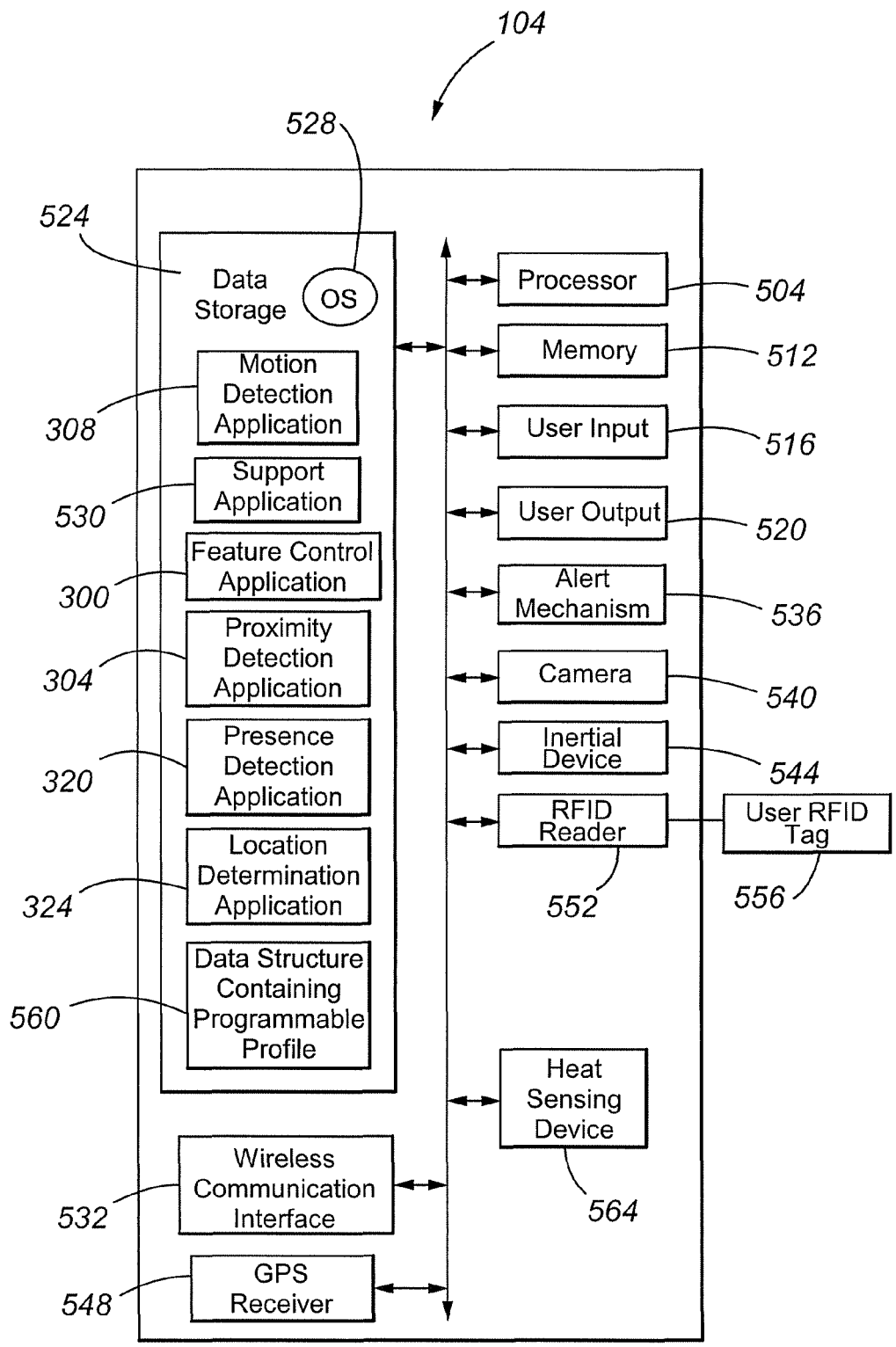
FIG. 5 is a schematic depiction of components of a mobile communication device in accordance with embodiments of the present invention.

With reference to FIG. 5, components of a mobile communication device 104 implementing some or all of the functions associated with the feature control system 100 are depicted in block diagram form. The components may include a processor 504 capable of executing program instructions. Accordingly, the processor 504 may include any general-purpose programmable processor, digital signal processor (DSP) or controller for executing application programming. Alternatively, the processor 504 may comprise a specially configured application specific integrated circuit (ASIC). A processor 504 generally functions to run programming code implementing at least a portion of various the applications described above.

A mobile communication device 104 may additionally include memory 512 for use in connection with the execution of the programming by the processor 504 and for the temporary or long-term storage of data or program instructions. The memory 512 may comprise solid state memory resident, removable or remote in nature, such as DRAM and SDRAM. Where the processor 504 comprises a controller, the memory 512 may be integral to the processor 504.

In addition, the mobile communication device 104 may include one or more user inputs or means for receiving user input 516 and one or more user outputs or means for outputting 520. Examples of user inputs 516 include keyboards, keypads, touch screens, touch pads and microphones. Examples of user outputs 520 include speakers, display screens (including touch screens displays) and indicator lights. Furthermore, it can be appreciated by one of skill in the art that the user input 516 may be combined or operated in conjunction with the user output 520. An example of such integrated user input 516 and user output 520 is a touch screen display that can both represent visual information to a user and receive input selections from the user.

A mobile communication device 104 may also include data storage 524 for the storage of application programs and/or data. The data storage may contain the program instructions for the various application described above. The data storage 524 may also store one or more support applications 530. Operating system software 528 may also be stored by the data storage 524. The data storage 524 may comprise, for example, a solid state memory, a magnetic storage device, a solid state storage device, an optical storage device, a logical circuit, or any combination of any such devices. It should be appreciated that the programs and data that may be maintained in the data storage 524 can comprise software, firmware or hardware logic, depending on the particular implementation of the data storage 524. The data storage 524 may additionally include a data structure 560 containing one or more user 114 programmable profiles.

A mobile communication device 104 may include one or more devices for use in connection with motion detection application 316. In particular, the motion detection application 316 may be associated with an onboard digital camera or photo detector. In addition to its usual function of taking pictures and/or movies, a digital camera 540 may provide input to be used to detect motion of the mobile communication device 104. In particular, when the scenery, as viewed from the camera 540 changes, it can be assumed that the device 104 is moving. Alternatively or in addition, an inertial device 540 may also be provided to detect motion of the device 104. Examples of inertial devices 544 that be used include accelerometers and mercury switches.

A mobile communication device 104 may include a global positioning system (GPS) receiver 548 operable to obtain location information for use in connection with the location determining application 324 and/or the motion detection application 308. In particular, a GPS receiver 548 may use uses known methods to measure the location and/or changes in the location of the device 104. It should be appreciated that, a combination of different motion detection methods may be used to detect motion of the mobile communication device 104. For example, the motion detection application 308 may use both input from a camera 540 and input from a UPS receiver 548 to detect motion of the device 104.

An RFID reader device 552 may be associated with the mobile communication device 104 for use in connection with the RFID application 312. The RFID reader 552 is operable to read an RFID tag 556 that is associated with the user 114. Specifically, the RFID tag 556 may be part of an identification badge worn by the user 114 or may be sewn into an article of clothing worn by the user 114. In order for the RFID tag 556 to be read it must be in close proximity to the RFID reader 552. Accordingly, if the RFID reader 552 associated with the mobile communication device is able to read the RFID tag 556 associated with the user, then it may be assumed that the user 114 is in close proximity to the communication device 104.

A mobile communication device may include a heat-sensing device 564. The heat-sensing device is associated with the heat sensing application 316, as described above.

The mobile communication device 104 may additionally include a mobile communication interface 532 for connection to an external mobile communication network or endpoint. In addition to providing a pathway for normal mobile communication, the mobile communication interface 532 may be used in connection with the operation of the proximity detection application 304, the presence detection application 320, the location detection application 312 and/or the motion detection application 308. In particular, embodiments of the present invention may include portions of these applications that run on or receive information from one or more systems that are remote from the mobile communication device 104, such as the network server 504.

The mobile communication device 104 may additionally include an alert mechanism 536 such as a beeper, tone generator, vibration mechanism, or other device that provides a human perceptible alert. Alternatively or in addition, an alert may be provided by a user output device 520. The alert mechanism 536 is operatively associated with the feature control application 300, which may control and/or modify the operation of the alert mechanism 536 in accordance with embodiments of the present invention.

Figure 6:
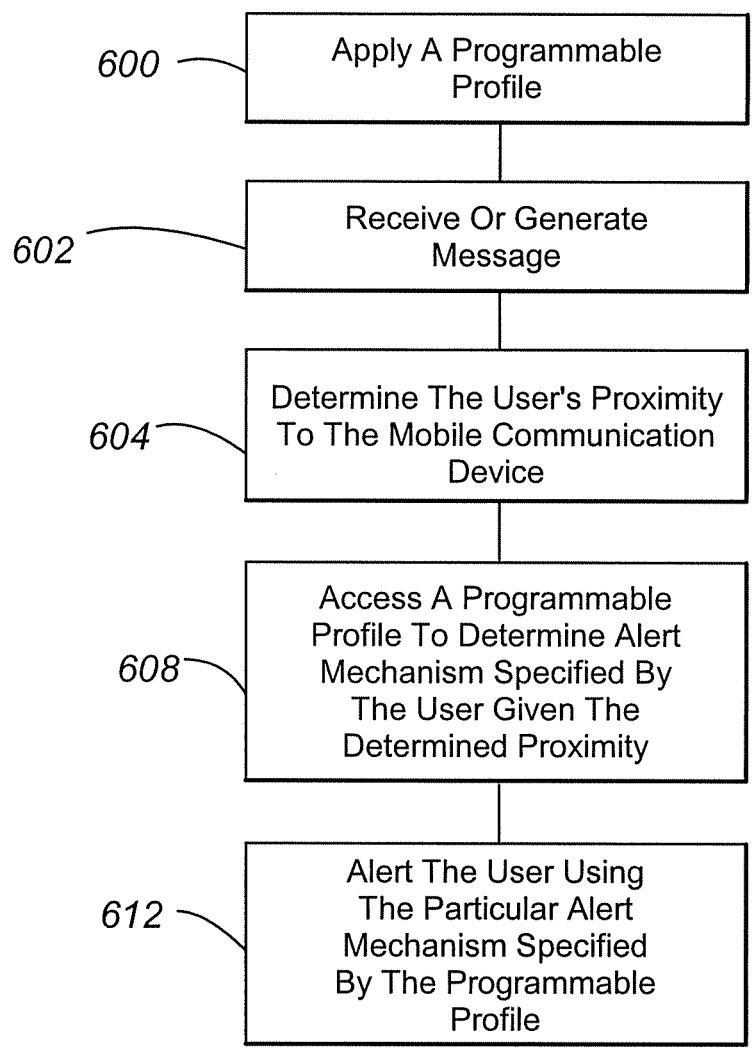
FIG. 6 is a flow chart depicting aspects of the operation of a programmable profile system in accordance with embodiments of the present invention.

With reference to FIG. 6, aspects of the operation of a programmable profile system 100 in accordance with embodiments of the present invention are illustrated. At step 600, a programmable profile 200 is selected and applied for use. Selection may include selecting particular profile settings included in the selected programmable profile 200 for providing alerts 210 when the device is located at various proximities from the user, specifications for providing alerts at different locations and/or times of the day, and/or important call expected settings. As described above, the user's 114 preferences are stored in a programmable profile 200 that specifies which alert mechanism out of a plurality of alert mechanism the user 114 wishes the device 104 to use at each of a plurality of proximity levels. Additionally, a plurality of programmable profiles 200 or profile settings may be stored that specify the user's 114 preferences in various contexts or at various times of the day.

At step 602, the mobile communication device 104 receives an incoming call or receives or generates a message. If a message is received, it may be in the form of an incoming message sent to the mobile communication device 104. For example, the incoming message may be a voice message left in a voice mailbox after a call to a mobile phone went unanswered. Alternatively, the incoming message may be a text message sent to a mobile phone or a personal digital assistant. The feature control application may also operate to inform the user of the presence of messages related to the operation of the device, such as low battery warnings.

At step 604, the proximity detection application 304 determines the user's 114 proximity to the communication device 104. As described above, a number of different possible methods for determining proximity are within the scope of the invention At step 608, the selected programmable profile 200 is accessed by the feature control application 300 to determine which alert mechanism the user 114 wishes to be used given the determined proximity between the user 114 and the communication device 104. This can include a selection of particular profile settings included in the selected programmable profile 200. At step 612, the communication device 104 proceeds to provide an alert in the manner specified by the selected programmable profile for the determined proximity level. By way of example, consider the case in which a call is received by the communication device 104 during the business day and the user is separated from his or her communication device 104 by a great distance. In order to provide an alert in the appropriate manner, in step 604 it is determined that the user's 114 proximity to the communication device 104 is "Distant." In step 608, it is determined that the communication device 104 should provide a "Silent" alert. Specifically, a business hours programmable profile 200 is accessed to determine the user 114 specified alert mode given the "Distant" proximity. Accordingly, at step 612 the communication device 104 provides a "Silent" alert.

Figure 7:
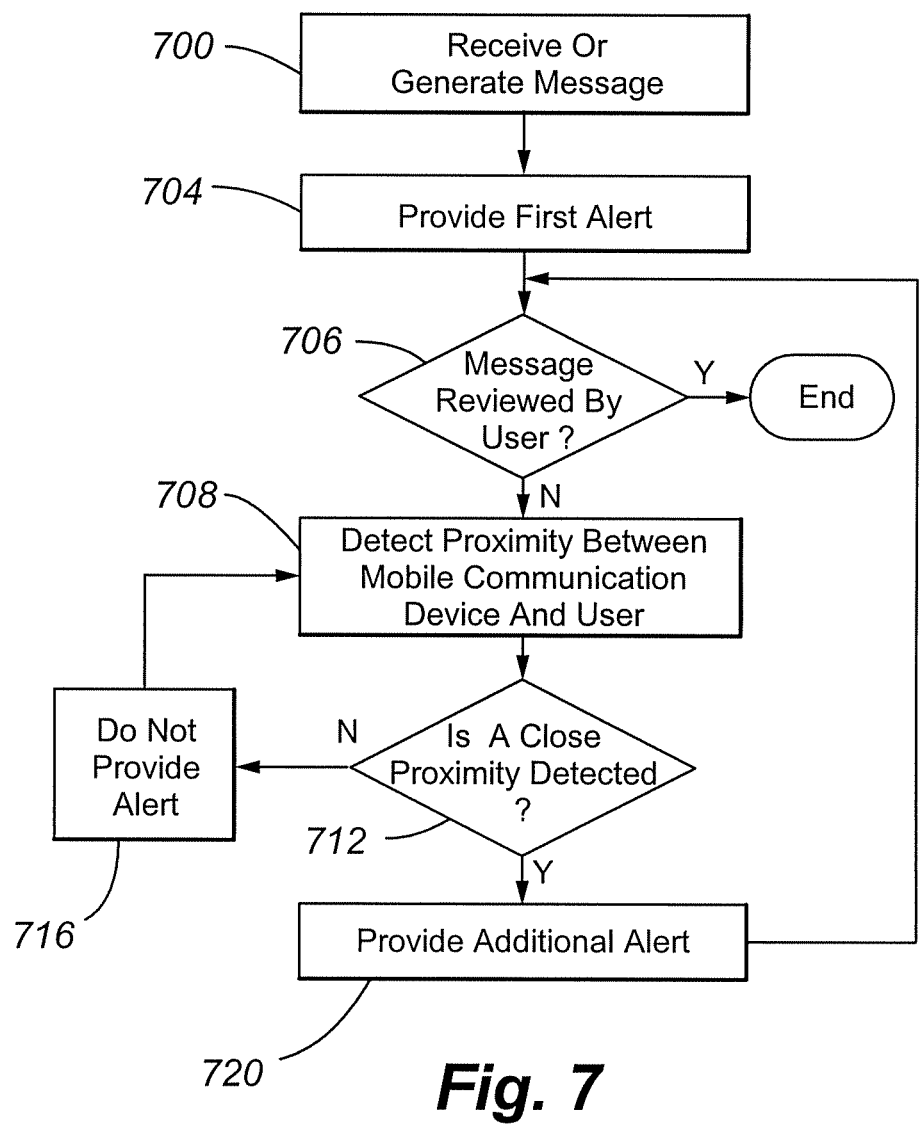
FIG. 7 is a flow chart depicting aspects of the operation of a programmable profile system in accordance with other embodiments of the present invention.

In accordance with embodiments of the present invention, the programmable profile 200 may specify that only a portion of an alert may be given for some proximities of the user 114 to the communication device 104. Specifically, if the user 114 location is outside of a certain distance, then the communication device 104 may provide an initial alert and thereafter suppress continued alerts. FIG. 7 illustrates this aspect of the operation of a programmable profile system 100. At step 704, a first audible alert is sounded to indicate that a message is waiting to be reviewed. This first audible alert is sounded for a limited amount of time and serves to provide the user 114 with an initial alert. This alert may or may not be heard depending on whether or not the user 114 is in the vicinity of the mobile communication device 104. If the audible alert is heard, the user 114 may decide to review the message and take appropriate action (decision 706). In the case of an incoming voice message, the user 114 may listen to the voice message. In the case of a low battery warning, the user 114 may plug the communication device 104 into a charging device. If the message is reviewed by the user 114, then operation of the programmable profile system 100 may be allowed to end, and the alert for that message is cleared. If, however, the message is not reviewed by the user 114, the process proceeds to step 708.

At step 708, the message remains unreviewed and the proximity detection application 304 proceeds to detect the user's 114 proximity to the mobile communication device 104. As described above, various methods of proximity detection are within the scope of the invention.

At decision diamond 712, the proximity detection application 304 determines if the user 114 is in close proximity to the mobile communication device 104. If the user 114 and the mobile communication device 104 are not in close proximity, then no alert reminders are provided (step 716). After step 716, step 708 follows, and the proximity detection application 304 continues to detect the user's 114 proximity to the mobile communication device 104. If, at decision 712, the user 114 and the mobile communication device 104 are determined to be in close proximity, then an additional audible alert is provided (step 720). After step 720, the process returns to step 706 in order that the feature control application 300 may continue to suppress further alerts when the user 114 and the mobile communication device 104 are not in close proximity. The operation of the feature control system 100 continues in this way until the user 114 of the mobile communication device 104 attends to the unreviewed message or messages.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation. The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of providing an alert associated with a mobile communication device comprising:
   detecting a predetermined condition by the mobile communication device, wherein the predetermined condition is a programmable profile setting indicating that an important call is expected by a user;
   determining presence information associated with the user, wherein presence information includes one or more of a location and availability of the user;
   determining a proximity of the user to the mobile communication device, wherein determining the proximity of the user to the mobile communication device includes determining if the user is at a different location than the mobile communication device;

accessing a first programmable profile, wherein the first programmable profile defines a plurality of user proximity levels each having an assigned alert mechanism;

applying the determined proximity of the user to the mobile communication device and the predetermined condition to the first programmable profile to determine an alert mechanism corresponding to the user's proximity to the mobile communication device; and alerting the user by using the determined alert mechanism.

2. The method of claim 1, wherein, in the determining step, the user is determined to be moving away from the mobile communication device, wherein the first programmable profile is one of a plurality of programmable profiles that each define a plurality of user proximity levels each having an assigned alert mechanism, and wherein one of the programmable profiles is accessed based on a context in which the mobile communication device is being used.

3. The method of claim 1, wherein the alert mechanism includes at least one of: loud ring, soft ring, vibrate, and silent.

4. The method of claim 1, wherein the predetermined condition includes at least one of:
an incoming call;
a voice message received by the mobile communication device;
a picture message received by the mobile communication device;
a text message received by the mobile communication device;
an internet communication;
a time alarm; and
a low battery warning.

5. The method of claim 1, wherein determining the proximity of the user to the mobile communication device includes:
determining location information for the mobile device; and
comparing the location information for the mobile device and the presence information for the user.

6. The method of claim 5, wherein the steps of determining location information for the mobile device and determining presence information for the user are performed by at least one application external to the mobile device.

7. The method of claim 1, wherein determining the proximity of the user to the mobile communication device includes:
detecting motion of the mobile communication device by at least one of:
(a) receiving a signal from a global positioning system application associated with the mobile communication device;
(b) detecting changes in a scenery as viewed from a camera associated with the mobile communication device;
(c) detecting changes in a velocity of the mobile communication device;
(d) detecting changes in a mobile communication signal strength associated with the mobile communication device; and
(e) detecting body heat of the user.

8. The method of claim 7, wherein, in the determining function, the user is determined to be moving away from the mobile communication device, wherein determining the proximity of the user to the mobile device includes detecting motion of the mobile communication device by detecting changes in the scenery as viewed from the camera associated with the mobile communication device.

9. The method of claim 7, wherein determining the proximity of the user to the mobile device includes detecting motion of the mobile communication device by detecting body heat of the user.

10. The method of claim 1, wherein determining the user's proximity to the mobile communication device includes reading an RFID tag associated with the user by an RFID reader associated with the mobile communication device.

11. An alert system comprising:
a mobile communication device associated with a user;
an alert mechanism associated with the mobile communication device operable to produce at least one type of human perceptible alert signal indicating a predetermined condition;
a proximity detection application associated with the mobile communication device operable to detect the user's proximity to the mobile communication device, to determine an associated user proximity level, to determine presence information associated with the user, and to determine if the user is at a different location than the mobile communication device, wherein presence information includes one or more of a location and availability of the user; and
at least one programmable profile associated with the mobile communication device that specifies a type of human perceptible alert for each of a plurality of the user proximity levels, wherein the at least one programmable profile includes a setting indicating that an important call is expected;
wherein the alert mechanism is operable to notify the user of the predetermined condition using a particular type of human perceptible alert generated by the alert mechanism, wherein the particular type of human perceptible alert is specified by the at least one programmable profile for a determined proximity between the user and the mobile communication device.

12. The alert system of claim 11, wherein, in the determining operation, the user is determined to be moving away from the mobile communication device, wherein the at least one programmable profile is one of a plurality of programmable profiles that each define a plurality of user proximity levels each having an assigned alert mechanism, and wherein a particular programmable profile is selected based on a context in which the mobile communication device is being used.

13. The alert system of claim 11, wherein the mobile communication device is one of a group comprising: a cellular phone, a personal digital assistant, a wrist watch, and an environmental detector.

14. The alert system of claim 11, wherein the predetermined condition includes at least one of:
an incoming call;
a voice message received by the mobile communication device;
a picture message received by the mobile communication device;
a text message received by the mobile communication device;
an internet communication;
a time alarm; and
a low battery warning.

15. The alert system of claim 11, further comprising:
a location determining application capable of determining a location of the mobile device,
wherein the proximity detection application is capable of at least acquiring location information for the mobile device from the location determining application, acquiring presence information for the user from the presence detection application, and determining the user's proximity to the mobile device based on a comparison of at least the location information for the mobile device and the presence information for the user.

16. The alert system of claim 11, further comprising:
a motion detection application associated with the mobile communication device operable to detect movement of the mobile communication device;
wherein motion of the mobile communication device indicates that the user's proximity to the mobile communication device is within a predetermined distance.

17. The alert system of claim 16, wherein the motion detection application detects movement of the mobile communication device by at least one of the following:
  (a) detecting changes in the location of the mobile communication using a global positioning system receiver;
  (b) detecting changes in a scenery as viewed from a camera associated with the mobile communication device;
  (c) detecting changes in a velocity of the mobile communication device; and
  (d) detecting changes in a mobile communication signal strength associated with the mobile communication device.

18. The alert system of claim 11, further comprising:
an RFID reader associated with the mobile communication device, the RFID reader being operable to read an RFID tag associated with the user;
wherein the proximity detection application uses the RFID reader to determine if the user is in close proximity to the mobile communication device.

19. The alert system of claim 11, further comprising a plurality of programmable profiles that specify a particular type of human perceptible alert for each of a plurality of user proximity levels, each programmable profile being operable during at least one of:
  (a) different hours of the day;
  (b) the user's operation of the mobile communication device in two or more different locations; and
  (c) different times as determined by an electronic calendar.

20. An alert system comprising:
means for providing mobile communication;
means for providing an alert to a user indicating a predetermined condition associated with the means for providing the mobile communication, wherein the predetermined condition is a programmable profile setting indicating that an important call is expected;
means for detecting the user's proximity to the means for providing the mobile communication, wherein the detection means detects a plurality of user proximity levels, wherein detecting the user's proximity to the means for providing the mobile communication includes detecting if the user is at a different location than the mobile communication device;
means for determining presence information associated with the user, wherein presence information includes one or more of a location and availability of the user; and
means for storing a programmable profile;
wherein the means for providing an alert provides a particular type of alert based on a selected programmable profile stored in the means for storing a programmable profile for the determined proximity between the user and the mobile communication device provided by the means for detecting.

* * * * *